(12) United States Patent
Ishida et al.

(10) Patent No.: US 10,421,129 B2
(45) Date of Patent: Sep. 24, 2019

(54) POLYCRYSTALLINE DIAMOND BODY, CUTTING TOOL, WEAR-RESISTANT TOOL, GRINDING TOOL, AND METHOD FOR PRODUCING POLYCRYSTALLINE DIAMOND BODY

(71) Applicant: Sumitomo Electric Industries, Ltd., Osaka-shi (JP)

(72) Inventors: Yuh Ishida, Itami (JP); Keiko Arimoto, Itami (JP); Katsuko Yamamoto, Itami (JP); Hitoshi Sumiya, Itami (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 15/555,764

(22) PCT Filed: Jan. 20, 2016

(86) PCT No.: PCT/JP2016/051501
§ 371 (c)(1),
(2) Date: Sep. 5, 2017

(87) PCT Pub. No.: WO2016/143391
PCT Pub. Date: Sep. 15, 2016

(65) Prior Publication Data
US 2018/0079010 A1  Mar. 22, 2018

(30) Foreign Application Priority Data

Mar. 6, 2015 (JP) .................................. 2015-044438

(51) Int. Cl.
| | |
|---|---|
| *B32B 27/20* | (2006.01) |
| *B32B 27/14* | (2006.01) |
| *B24D 3/00* | (2006.01) |
| *B24D 18/00* | (2006.01) |
| *C04B 35/52* | (2006.01) |
| *C01B 32/25* | (2017.01) |
| *B01J 3/06* | (2006.01) |
| *C04B 35/528* | (2006.01) |
| *C04B 35/645* | (2006.01) |
| *B23B 27/20* | (2006.01) |
| *B23B 27/14* | (2006.01) |

(52) U.S. Cl.
CPC ............... *B23B 27/20* (2013.01); *B01J 3/065* (2013.01); *B23B 27/14* (2013.01); *B24D 3/00* (2013.01); *B24D 18/0009* (2013.01); *C01B 32/25* (2017.08); *C04B 35/52* (2013.01); *C04B 35/528* (2013.01); *C04B 35/645* (2013.01); *C01P 2002/74* (2013.01); *C01P 2004/64* (2013.01); *C01P 2006/21* (2013.01); *C04B 2235/425* (2013.01); *C04B 2235/427* (2013.01); *C04B 2235/5445* (2013.01); *C04B 2235/656* (2013.01); *C04B 2235/781* (2013.01); *C04B 2235/96* (2013.01)

(58) Field of Classification Search
CPC .......... B23B 27/20; C01B 32/25; B01J 3/065; C04B 35/52; C01P 2002/74
See application file for complete search history.

(56) References Cited

U.S. PATENT DOCUMENTS

| | | | |
|---|---|---|---|
| 4,923,490 A * | 5/1990 | Johnson ................ | B24D 3/06 51/295 |
| 9,254,554 B1 * | 2/2016 | Bertagnolli ............. | B01J 3/062 |
| 2012/0258035 A1 | 10/2012 | Sumiya et al. | |
| 2014/0026492 A1 * | 1/2014 | Tatsumi ................ | B23B 27/141 51/307 |
| 2015/0274533 A1 * | 10/2015 | Arimoto ................ | C04B 35/52 428/408 |

FOREIGN PATENT DOCUMENTS

| | | |
|---|---|---|
| JP | H04-074766 A | 3/1992 |
| JP | H04-114966 A | 4/1992 |
| JP | 2003-292397 A | 10/2003 |
| JP | 2011-190124 A | 9/2011 |

OTHER PUBLICATIONS

"Indentation hardness of nano-polycrystalline diamond prepared from graphite by direct conversion" by H. Sumiya et al. published on Apr. 24, 2004 in "Diamond and Related Materials".*

Bundy, "Direct Conversion of Graphite to Diamond in Static Pressure Apparatus," J. Chem. Phys., vol. 38, No. 3 (1963) pp. 631-643.

Wakatsuki et al., "Notes on Compressible Gasket and Bridgman-Anvil Type High Pressure Apparatus," Japan. J. Appl. Phys., vol. 11, No. 4 (1972) pp. 578-590.

Naka et al., "Direct conversion of graphite to diamond under static pressure," Nature, vol. 259 (1976) pp. 38-39.

Irifune et al., "Nature of Polycrystalline Diamond Synthesized by Direct Conversion of Graphite Using Kawai-Type Multianvil Apparatus," New Diamond and Frontier Carbon Technology, vol. 14, No. 5 (2004) pp. 313-327.

(Continued)

*Primary Examiner* — Pegah Parvini
(74) *Attorney, Agent, or Firm* — Baker Botts L.L.P.; Michael A. Sartori

(57) ABSTRACT

A polycrystalline diamond body contains diamond particles, the diamond particles have a mean particle size of 50 nm or less, and a crack initiation load is 10 N or more as measured in a fracture strength test by pressing a diamond indenter D with a tip radius Dr of 50 μm against a surface of the polycrystalline diamond body at a load rate F of 100 N/min. Accordingly, a polycrystalline diamond body that is tough and has a small diamond particle size, a cutting tool, a wear-resistant tool, a grinding tool, and a method for producing the polycrystalline diamond body are provided.

5 Claims, 1 Drawing Sheet

(56) References Cited

OTHER PUBLICATIONS

Sumiya et al., "Synthesis of High-Purity Nano-Polycrystalline Diamond and Its Characterization," SEI Technical Review, No. 165 (2004) pp. 68-74.
Dubrovinskaia et al., "Nanocrystalline diamond synthesized from $C_{60}$," Diamond and Related Matters 14, 2005, pp. 16-22 [Cited in Communication dated Oct. 30, 2018 in counterpart European Patent Application].

* cited by examiner

POLYCRYSTALLINE DIAMOND BODY, CUTTING TOOL, WEAR-RESISTANT TOOL, GRINDING TOOL, AND METHOD FOR PRODUCING POLYCRYSTALLINE DIAMOND BODY

TECHNICAL FIELD

The present invention relates to a polycrystalline diamond body, a cutting tool, a wear-resistant tool, a grinding tool, and a method for producing a polycrystalline diamond body. More particularly, the invention relates to a polycrystalline diamond body useful as a cutting tool, a wear-resistant tool, and a grinding tool, as well as the cutting tool, the wear-resistant tool, the grinding tool, and a method for producing the polycrystalline diamond body.

BACKGROUND ART

A sintered diamond material used for conventional diamond tools is obtained using a metal such as cobalt (Co) and a ceramic such as silicon carbide (SIC) as a sintering aid and a binder. Further, Japanese Patent Laying-Open No. 4-074766 (Patent Document 1) and Japanese Patent Laying-Open No. 4-114966 (Patent Document 2), for example, disclose a method using carbonates as sintering aids. According to these documents, a sintered diamond material is obtained by sintering diamond powder along with a sintering aid and a binder under stable high-pressure and high-temperature conditions in which diamond is thermodynamically stable (generally, a pressure of 5 to 8 GPa and a temperature of 1300 to 2200° C.). Naturally occurring polycrystalline diamond bodies (carbonado and ballas) are also known, and some of them are used for drill bits. These polycrystalline diamond bodies, however, are not much used for industrial purposes, since they vary significantly in material quality, and can only be found in limited quantities.

A polycrystalline diamond body obtained using a sintering aid contains the sintering aid, which may act as a catalyst promoting graphitization of diamond. As a result, the heat resistance of the resulting polycrystalline diamond body deteriorates. Further, when heat is applied to the polycrystalline diamond body, fine cracks tend to develop due to a difference in thermal expansion between the catalyst and the diamond. As a result, the mechanical properties of the polycrystalline diamond body deteriorate.

Polycrystalline diamond bodies are also known from which the metal present at grain boundaries of diamond particles has been removed to improve the heat resistance. Although this method improves the heat-resistant temperature to about 1200° C., the polycrystalline body becomes porous and thus, has further decreased strength. A polycrystalline diamond body obtained using SiC as a binder has high heat resistance, however, it has low strength because diamond particles are not bonded together.

A method is also known in which non-diamond carbon such as graphite or amorphous carbon is directly converted into diamond at an ultra-high pressure and a high pressure, without using a catalyst and/or a solvent, and sintered simultaneously (direct conversion and sintering method). J. Chem. Phys., 38 (1963) pp. 631-643 (Non-Patent Document 1), Japan. J. Appl. Phys., 11 (1972) pp. 578-590 (Non-Patent Document 2), and Nature 259 (1976) p. 38 (Non-Patent Document 3), for example, show that a polycrystalline diamond body is obtained using graphite as a starting material under an ultra-high pressure of 14 to 18 GPa and a high temperature of 3000 K or more.

However, in the production of a polycrystalline diamond body according to Non-Patent Documents 1, 2, and 3, a method of heating by direct current passage is used in which conductive non-diamond carbon such as graphite is heated by directly passing current therethrough. The polycrystalline diamond body thus obtained contains remaining non-diamond carbon graphite, and also has a nonuniform crystal grain size of diamond. As a result, the polycrystalline diamond body has poor hardness and strength.

In order to improve the hardness and strength, New Diamond and Frontier Carbon Technology, 14 (2004) p. 313 (Non-Patent Document 4) and SEI Technical Review 165 (2004) p. 68 (Non-Patent Document 5) show a method for obtaining a dense and high-purity polycrystalline diamond body by a direct conversion and sintering method in which high-purity graphite as a raw material is indirectly heated at an ultra-high pressure of 12 GPa or more and a high temperature of 2200° C. or more.

CITATION LIST

Patent Documents

PTD 1: Japanese Patent Laying-Open No. 4-074766
PTD 2: Japanese Patent Laying-Open No. 4-114966

Non Patent Documents

NPD 1: J. Chem. Phys., 38 (1963) pp. 631-643
NPD 2: Japan. J. Appl. Phys., 11 (1972) pp. 578-590
NPD 3: Nature 259 (1976) p. 38
NPD 4: New Diamond and Frontier Carbon Technology, 14 (2004) p. 313
NPD 5: SEI Technical Review 165 (2004) p. 68

SUMMARY OF INVENTION

Technical Problem

In the production of a polycrystalline diamond body according to New Diamond and Frontier Carbon Technology, 14 (2004) p. 313 (Non-Patent Document 4) and SEI Technical Review 165 (2004) p. 68 (Non-Patent Document 5), the sintering temperature is reduced in order to obtain a polycrystalline diamond body having a small particle size for use in ultra-precision machining, for example. As a result, the polycrystalline body cannot be sintered sufficiently, and has decreased strength. Moreover, when the particle size of diamond particles is small, toughness decreases, which makes the tool easily chipped.

Accordingly, it is an object to solve the aforementioned problems, and provide a polycrystalline diamond body that is tough and has a small particle size, a cutting tool, a wear-resistant tool, a grinding tool, and a method for producing the polycrystalline diamond body.

Solution to Problem

A polycrystalline diamond body according to an aspect of the invention contains diamond particles, the diamond particles have a mean particle size of 50 nm or less, and a crack initiation load is 10 N or more as measured in a fracture strength test by pressing a diamond indenter with a tip radius of 50 μm against a surface of the polycrystalline diamond body at a load rate of 100 N/min.

A method for producing a polycrystalline diamond body according to an aspect of the invention includes: preparing non-diamond carbon powder having a particle size of 0.5 μm or less as a starting material; and converting the non-diamond carbon powder into diamond particles and sintering the diamond particles at a temperature and a pressure satisfying conditions: $P \geq 0.000001886T^2 - 0.01467T + 37.78$; $T \leq 2300$; and $P \leq 25$, where P represents pressure in GPa and T represents temperature in °C.

Advantageous Effects of Invention

In accordance with the foregoing, a polycrystalline diamond body that is tough and has a small particle size, a cutting tool, a wear-resistant tool, a grinding tool, and a method for producing the polycrystalline diamond body are provided.

DESCRIPTION OF EMBODIMENTS

Description of Embodiments of the Invention

Figure 1:
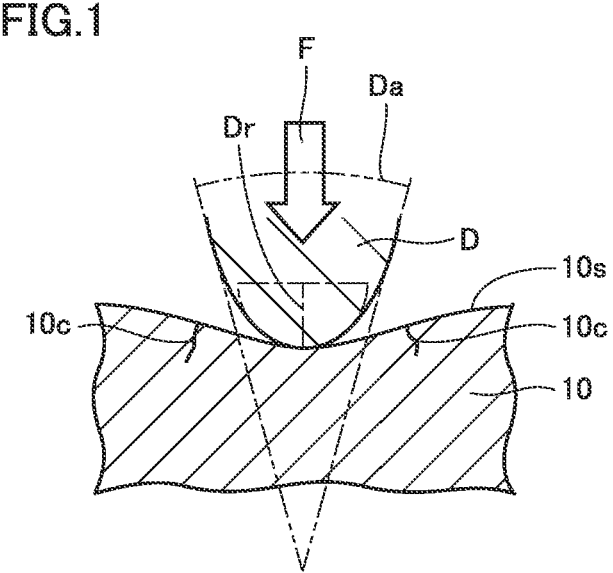
FIG. 1 is a schematic cross-sectional view illustrating a fracture strength test for a polycrystalline diamond body.

The present inventors have conducted extensive research to solve the aforementioned problems, and found that when non-diamond carbon powder such as graphite having a particle size of 0.5 μm or less is directly converted into diamond particles at a high pressure and a high temperature, a polycrystalline diamond body that is tough and has a fine structure is obtained.

[1] A polycrystalline diamond body according to an aspect of the invention contains diamond particles, the diamond particles has a mean particle size of 50 nm or less, and a crack initiation load is 10 N or more as measured in a fracture strength test by pressing a diamond indenter with a tip radius of 50 μm against a surface of the polycrystalline diamond body at a load rate of 100 N/min. This polycrystalline diamond body is tough and has a fine particle size of the diamond particles forming the polycrystalline diamond body.

[2] The diamond particles preferably have a mean particle size of 30 nm or less. The further reduced mean particle size makes the polycrystalline diamond body more suitable for use in applications that require a small particle size.

[3] The diamond particles preferably have a ratio of an X-ray diffraction intensity $I_{(220)}$ in a (220) plane with respect to an X-ray diffraction intensity $I_{(111)}$ in a (111) plane according to X-ray diffraction, expressed as a ratio $I_{(220)}/I_{(111)}$, of not less than 0.1 and not more than 0.3. This makes the polycrystalline body isotropic, so that when the polycrystalline body is used for a tool or the like, partial wear can be reduced.

[4] A cutting tool according to an aspect of the invention includes the above-described polycrystalline diamond body. This cutting tool is useful for cutting various materials.

[5] A wear-resistant tool according to an aspect of the invention includes the above-described polycrystalline diamond body. This wear-resistant tool is useful for machining various materials.

[6] A grinding tool according to an aspect of the invention includes the above-described polycrystalline diamond body. This grinding tool is useful for grinding various materials.

[7] A method for producing a polycrystalline diamond body according to an aspect of the invention includes: preparing non-diamond carbon powder having a particle size of 0.5 μm or less as a starting material; and converting the non-diamond carbon powder into diamond particles and sintering the diamond particles at a temperature and a pressure satisfying conditions: $P \geq 0.000001886T^2 - 0.01467T + 37.78$; $T \leq 2300$; and $P \leq 25$, where P represents pressure in GPa and T represents temperature in °C. The polycrystalline diamond body obtained by this method is tough and has a fine particle size of the diamond particles forming the polycrystalline diamond body.

DETAILS OF EMBODIMENTS OF THE INVENTION

An embodiment of the invention (hereinafter referred to as "the present embodiment") will be hereinafter described in further detail.

<Polycrystalline Diamond Body>

As shown in FIG. 1, a polycrystalline diamond body 10 according to the present embodiment contains diamond particles, the diamond particles have a mean particle size of 50 nm or less, and crack initiation load is 10 N or more as measured in a fracture strength test by pressing a diamond indenter D with a tip radius Dr of 50 μm against a surface 10s of polycrystalline diamond body 10 at a load rate F of 100 N/min. Polycrystalline diamond body 10 of the present embodiment is tough and has a fine particle size of the diamond particles forming the polycrystalline diamond body.

As described above, polycrystalline diamond body 10 according to the present embodiment contains diamond particles. As long as the polycrystalline diamond body contains diamond particles, it may also contain inevitable impurities in an amount that allows the effects of the present embodiment to be exhibited. Examples of the inevitable impurities may include nitrogen (N), hydrogen (H), oxygen (O), and the like. The polycrystalline body is substantially free of a binder, a sintering aid, a catalyst, and the like. This is one of advantages of the polycrystalline diamond body of the present embodiment, because this can overcome the disadvantages of containing a binder, a sintering aid, and/or a catalyst, as in conventional sintered diamond materials.

It is noted that although the polycrystalline diamond body is a sintered material, generally the term "sintered material" intends to mean a sintered material containing a binder in most cases, and therefore, the term "polycrystalline body" is used in the present embodiment.

<Diamond Particles>

The diamond particles contained in polycrystalline diamond body 10 of the present embodiment have a small particle size, and specifically, the diamond particles have a mean particle size of 50 nm or less, and preferably a mean particle size of 30 nm or less. Since a smaller mean particle size is preferable, it is not necessary to define the lower limit of the mean particle size. From a production standpoint, however, the lower limit of the mean particle size is 10 nm. The further reduced mean particle size of the diamond particles makes the polycrystalline diamond body more suitable for use in applications that require a small particle size.

The particle size of the diamond particles is preferably uniform, in order to eliminate stress concentration and provide high strength. The particle size distribution is preferably a normal distribution. The mean particle size is preferably a mean of the normal distribution. The "particle size of the diamond particles" as simply referred to herein represents the particle size of crystal grains of the diamond particles forming the polycrystalline diamond body.

The above-described mean particle size can be determined by an intercept method using a scanning electron microscope. Specifically, the polycrystalline diamond body is first observed with a scanning electron microscope (SEM) at 1000 to 100000 times magnification to obtain an SEM image.

A circle is then drawn on the SEM image, and eight straight lines are drawn radially from the center of the circle to the perimeter of the circle (such that the intersection angle between adjacent straight lines is substantially equal). In this case, the observation magnification and the diameter of the circle described above are preferably set such that the number of diamond particles (crystal grains) per straight line is about 10 to 50.

Next, for each straight line, the number of times that the straight line crosses grain boundaries of the diamond particles is counted, an average intercept length is determined by dividing the length of the straight line by the counted number of the crossings, and the average intercept length is multiplied by 1.128 to give the mean particle size. It is noted that more preferably this mean particle size is determined suitably by using a plurality of SEM images, determining the mean particle size for each image in the manner as described above, and calculating the average of the determined mean particle sizes.

Since the diamond particles contained in the polycrystalline diamond body of the present embodiment have such a small particle size, the polycrystalline diamond body used for a tool or the like is applicable to a wide range of applications such as high-load applications and micromachining applications.

<Fracture Strength Test>

Regarding polycrystalline diamond body 10 according to the present embodiment as shown in FIG. 1, a crack initiation load is 10 N or more as measured in a fracture strength test by pressing diamond indenter D with a tip radius Dr of 50 μm against a surface of the polycrystalline diamond body at a load rate F of 100 N/min.

The fracture strength test is performed in the following way. First, diamond indenter D with a tip radius Dr of 50 μm is prepared. Next, diamond indenter D is pressed against surface 10s of polycrystalline diamond body 10 at a load rate F of 100 N/min, and the load (crack initiation load) at the moment when a crack 10c is generated in polycrystalline diamond body 10 is measured. The load at the moment when crack 10c is generated is measured with an AE (Acoustic Emission) sensor. The greater the crack initiation load, the higher the fracture strength.

If diamond indenter D has a tip radius Dr of less than 50 μm, polycrystalline diamond body 10 will be plastically deformed before crack 10c is generated and the correct crack initiation load cannot be measured. If diamond indenter D has a tip radius Dr of more than 50 μm, the crack initiation load can be measured but a greater load is required until crack 10c is generated. Accordingly, in the fracture strength test for polycrystalline diamond body 10, diamond indenter D having a tip radius Dr of 50 μm is used.

Figure 2:
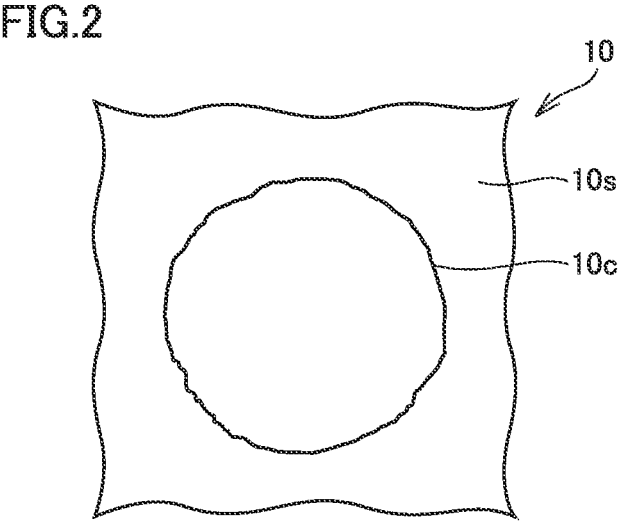
FIG. 2 is a schematic plan view illustrating a shape, as seen in plan view, of a crack generated in a polycrystalline diamond body.

The shape, as seen in plan view, of crack 10c generated in polycrystalline diamond body 10 of the present embodiment is not particularly limited. As shown in FIGS. 1 and 2, in most cases the crack has a substantially circular shape around a point where diamond indenter D is pressed.

<X-Ray Diffraction>

The diamond particles contained in polycrystalline diamond body 10 of the present embodiment preferably have a ratio of an X-ray diffraction intensity $I_{(220)}$ in a (220) plane with respect to an X-ray diffraction intensity $I_{(111)}$ in a (111) plane according to X-ray diffraction, expressed as a ratio $I_{(220)}/I_{(111)}$, of not less than 0.1 and not more than 0.3. This makes the polycrystalline body isotropic, so that when the polycrystalline body is used for a tool or the like, partial wear can be reduced.

If the ratio $I_{(220)}/I_{(111)}$ is outside the above-defined range, the polycrystalline body will be oriented and anisotropic. In this case, the polycrystalline body will show a distribution of strength, and include surfaces that vary in strength. This makes the polycrystalline body unsuitable for use in a tool. If the polycrystalline body is used particularly as a rotary tool such as an end mill, it will both have a surface resistant to wear or chipping and a surface not resistant to wear or chipping, and is subject to partial wear. In order to avoid this drawback, the polycrystalline body is preferably isotropic.

<Applications>

Polycrystalline diamond body 10 of the present embodiment is tough and has a fine particle size of diamond particles (crystal grains), and therefore, is suitable for use in a cutting tool, a wear-resistant tool, a grinding tool, and the like. That is, each of the cutting tool, the wear-resistant tool, and the grinding tool of the present embodiment includes the above-described polycrystalline diamond body. The cutting tool, the wear-resistant tool, and the grinding tool of the present embodiment are respectively useful for cutting, machining, and grinding various materials.

It is noted that each of these tools may be entirely formed of the polycrystalline diamond body, or may be only partially (the cutting edge in the case of a cutting tool, for example, may be) formed of the polycrystalline diamond body. Alternatively, each tool may have a coating film formed on its surface.

Examples of the cutting tool may include a drill, an end mill, an insert for drilling, an insert for end milling, an insert for milling, an insert for lathe turning, a metal saw, a gear cutting tool, a reamer, a tap, a cutting bit, and the like.

Examples of the wear-resistant tool may include a die, a scriber, a scribing wheel, a dresser, and the like.

Examples of the grinding tool may include a grinding wheel and the like.

<Production Method>

A method for producing polycrystalline diamond body 10 according to the present embodiment includes the steps of: preparing non-diamond carbon powder having a particle size of 0.5 μm or less as a starting material (hereinafter also referred to as "preparation step"); and converting the non-diamond carbon powder into diamond particles and sintering the diamond particles at a temperature and a pressure satisfying conditions: $P \geq 0.000001886T^2 - 0.01467T + 37.78$; $T \leq 2300$; and $P \leq 25$, where P represents pressure in GPa and T represents temperature in °C. (hereinafter also referred to as "sintering step"). Polycrystalline diamond body 10 obtained by the method for producing polycrystalline diamond body 10 in the present embodiment is tough and has a fine particle size of the diamond particles forming the polycrystalline diamond body.

The above-described method enables polycrystalline diamond body 10 described above to be produced. That is, polycrystalline diamond body 10 obtained by this method is tough and has a fine particle size (i.e., a mean particle size of 50 nm or less) of the diamond particles forming the polycrystalline diamond body.

In the preparation step, the non-diamond carbon powder used as the starting material is not particularly limited as long as it is carbon other than diamond, and may be graphite, amorphous carbon, or the like.

The particle size of the non-diamond carbon powder is preferably slightly greater than the mean particle size of the diamond particles of polycrystalline diamond body 10 to be obtained. This is because, due to recombination through the rearrangement of atoms during conversion of the non-diamond carbon powder into diamond, the particle size of the diamond will become smaller than the particle size of the raw material. It is noted here that if the particle size of the raw material is small, the number of grain boundaries where the original non-diamond carbon particles are not bonded together will increase. As a result, the diamond after conversion will have a small particle size. On the contrary, if the particle size of the raw material is large, the diamond will have a large particle size, and hence the toughness will decrease. The particle size of the non-diamond carbon powder is therefore set to 0.5 μm or less, and the lower limit value thereof is set to 0.05 μm for the sake of production. More preferably, the particle size of the non-diamond carbon powder is not less than 0.1 μm and not more than 0.5 μm.

As used herein, the particle size of the non-diamond carbon powder refers to a mean particle size measured by the laser diffraction/scattering method using laser light.

The means for the preparation step is not limited as long as the non-diamond carbon powder is prepared. Examples of the means may include producing the non-diamond carbon powder using a conventionally known synthesis method, and obtaining commercially available non-diamond carbon powder.

Further, it is necessary for pressure P (GPa) and temperature T (° C.) in the sintering step to satisfy the conditions: $P \geq 0.000001886T^2 - 0.01467T + 37.78$; $T \leq 2300$; and $P \leq 25$, because the issue of durability may arise at a higher pressure, uncovered graphite may remain at a lower pressure, grain growth may occur at a higher temperature, and an unconverted graphite may remain at a lower temperature, which causes the toughness to decrease.

Temperature T (° C.) is not particularly limited as long as polycrystalline diamond body 10 is obtained, and it is not necessary to define the lower limit thereof. Temperature T (° C.) is more preferably 1300 to 2300° C.

Similarly, pressure P (GPa) is not particularly limited as long as polycrystalline diamond body 10 is obtained, and it is not necessary to define the lower limit thereof. Pressure P (GPa) is more preferably 15 to 25 GPa.

When a temperature and a pressure within the above-defined suitable ranges are used and the sintering step that satisfies the above-defined relational expressions is performed, the crack initiation load of the resulting polycrystalline diamond body is 10 N or more.

It is noted that the time during which the temperature and the pressure are applied in the sintering step is preferably 5 to 20 minutes. If the time is shorter than 5 minutes, sintering will be insufficient, and even if the time is over 20 minutes, the sintered condition will be the same, which is economically disadvantageous. The application time is more preferably 10 to 20 minutes.

This sintering step is a step of converting the non-diamond carbon powder into diamond particles and sintering the diamond particles. The non-diamond carbon powder alone is directly converted into diamond particles without using a sintering aid or a catalyst, and this conversion generally takes place simultaneously with sintering.

Polycrystalline diamond body 10 obtained by the method as described above has a fine particle size of the diamond particles forming the polycrystalline diamond body, and also has high strength and toughness. This makes the polycrystalline body tough with improved chipping resistance. The polycrystalline diamond body, therefore, can be suitably used for a cutting tool, a wear-resistant tool, a grinding tool, and the like for use in applications such as high-speed micromachining with high load, for example.

EXAMPLES

Examples 1 to 6

Each of polycrystalline diamond bodies according to Examples 1 to 6 was prepared in the manner described below. As non-diamond carbon particles for use as a starting material, graphite powder having a particle size of 0.5 μm or less (denoted as "fine graphite powder" in the column of starting material shown in Table 1 below) was prepared first (preparation step).

Next, the prepared graphite powder was placed in a capsule made of a high-melting-point metal having a melting point of 2700° C. or more, and maintained for 20 minutes at the pressure and the temperature shown in Table 1 (the column of "synthesis conditions"), using an ultra-high pressure and high temperature generating apparatus. The fine graphite powder was thereby converted into diamond particles and sintered (sintering step). A polycrystalline diamond body was thus obtained.

Pressure P (GPa) and temperature T (° C.) in each of Examples 1 to 6 shown in Table 1 satisfy the conditions: $P \geq 0.000001886T^2 - 0.01467T + 37.78$, $T \leq 2300$, and $P \leq 25$.

Comparative Examples 1 to 3

Each of polycrystalline diamond bodies according to Comparative Examples 1 to 3 was prepared in the manner described below. As non-diamond carbon powder for use as a starting material, graphite powder having a particle size of 0.5 μm or less (denoted as "fine graphite powder" in the column of starting material shown in Table 1 below) was prepared first (preparation step).

Next, the prepared graphite powder was placed in a capsule made of a high-melting-point metal having a melting point of 2700° C. or more, and maintained for 20 minutes at the pressure and the temperature shown in Table 1 (the column of "synthesis conditions"), using an ultra-high pressure and high temperature generating apparatus. The fine graphite powder was thereby converted into diamond particles and sintered (sintering step). A polycrystalline diamond body was thus obtained.

Pressure P (GPa) and temperature T (° C.) in Comparative Example 1 do not satisfy the condition $T \leq 2300$. Moreover, pressure P (GPa) and temperature T (° C.) in each of Comparative Examples 2 and 3 do not satisfy the condition $P \geq 0.000001886T^2 - 0.01467T + 37.78$.

Comparative Example 4

A polycrystalline diamond body according to Comparative Example 4 was prepared in the manner described below. As non-diamond carbon powder for use as a starting material, graphite powder having a particle size of 5 μm or less (denoted as "coarse graphite powder" in the column of starting material shown in Table 1 below) was prepared first (preparation step).

Next, the prepared graphite powder was placed in a capsule made of a high-melting-point metal having a melting point of 2400° C. or more, and maintained for 20 minutes at the temperature and the pressure shown in Table 1 (the column of "synthesis conditions"), using an ultra-high pressure and high temperature generating apparatus. The coarse graphite powder was thereby converted into diamond and sintered (sintering step). A polycrystalline diamond body was thus obtained.

It is noted that since the coarse graphite particles having a particle size of 5 μm or less were used as the starting material, the above-described conditions do not satisfy the condition of being non-diamond carbon powder having a particle size of 0.5 μm or less.

Comparative Example 5

A sintered diamond material according to Comparative Example 5 was prepared in the manner described below. As a starting material, powder obtained by mixing diamond powder having a mean particle size of 0.5 μm and a cobalt (Co)-based metal-based binder at a volume ratio of 85:15 (denoted as "diamond powder/metal-based binder powder" in the column of starting material shown in Table 1 below) was prepared first (preparation step).

Next, the prepared mixed powder was placed in a capsule made of a high-melting-point metal having a melting point of 2700° C. or more, and maintained for 20 minutes at the pressure and the temperature shown in Table 1 (the column of "synthesis conditions"), using an ultra-high pressure and high temperature generating apparatus. The mixed powder was thereby sintered (sintering step). A sintered diamond material was thus obtained. It is noted that the above-described conditions are different in terms of starting material from those in Examples 1 to 6, and Comparative Examples 1 to 4.

<Evaluation>

For each of the polycrystalline diamond bodies according to Examples 1 to 6, and Comparative Examples 1 to 4 and the sintered diamond material according to Comparative Example 5 obtained as described above, the composition, the X-ray diffraction, the particle size, and the crack initiation load were measured using the methods as described below.

<Composition>

The diamond particles contained in each of the polycrystalline diamond bodies and the sintered diamond material were identified using an X-ray diffractometer. The X-ray source of the X-ray diffractometer was Cu Kα radiation at a wavelength of 1.54 angstroms.

<X-Ray Diffraction>

For the diamond particles contained in each of the polycrystalline diamond bodies and the sintered diamond material, the ratio of the X-ray diffraction intensity $I_{(220)}$ in the (220) plane with respect to the X-ray diffraction intensity $I_{(111)}$ in the (111) plane, expressed as a ratio $I_{(220)}/I_{(111)}$, was determined using an X-ray diffractometer. The X-ray source of the X-ray diffractometer was Cu Kα radiation at a wavelength of 1.54 angstroms. The results are shown in the column of "XRD $I_{(220)}/I_{(111)}$" in Table 1.

<Particle Size>

The mean particle size of the diamond particles contained in each of the polycrystalline diamond bodies and the sintered diamond material was determined by an intercept method using a scanning electron microscope.

Specifically, the polycrystalline diamond bodies and the sintered diamond material were observed with a scanning electron microscope (SEM) to obtain SEM images.

A circle was then drawn on each of the SEM images, and eight straight lines were drawn radially from the center of the circle to the perimeter of the circle (such that the intersection angle between adjacent straight lines was substantially equal). In this case, the observation magnification and the diameter of the circle described above were set such that the number of diamond particles per straight line was about 10 to 50.

Next, for each straight line, the number of times that the straight line crossed grain boundaries of the diamond particles was counted, an average intercept length was determined by dividing the length of the straight line by the counted number of the crossings, and the average intercept length was multiplied by 1.128 to give the mean particle size.

It is noted that the SEM images were magnified by 30000 times. At a magnification below 30000 times, the number of particles within the circle will be large, which makes grain boundaries difficult to observe, and causes a counting error. Moreover, it is likely that the plate-like structure will be included when drawing lines. In contrast, at a magnification over 30000 times, the number of particles within the circle will be too small, and an accurate mean particle size cannot calculated. In each of Comparative Examples 1 and 5, the magnification was set to 3000 times because the particle size was too large.

For each of the Examples and the Comparative Examples, three SEM images taken of different places for a single specimen were used. A mean particle size was determined for each of the SEM images by the above-described method, and a mean value of the three mean particle sizes obtained was determined as the mean particle size. The results are shown in the column of "mean particle size" in Table 1.

<Crack Initiation Load>

For each of the polycrystalline diamond bodies and the sintered diamond material, a fracture strength test was performed under the following conditions in order to measure the crack initiation load.

Specifically, as shown in FIG. 1, a diamond indenter D with a tip radius Dr of 50 μm and a tip angle Da of 120° was prepared as an indenter, diamond indenter D was pressed, at a load rate F of 100 N/min, against a surface of the polycrystalline diamond body at 23° C.±5° C., and the load was kept applied until a crack was generated. This measurement was performed three times. The crack initiation load of each specimen was determined by averaging the three values obtained by the measurement performed three times as described above. The results are shown in the column of "crack initiation load" in Table 1. Further, as shown in FIG. 2, in each of Examples 1 to 6 and Comparative Examples 1 to 5, the shape, as seen in plan view, of crack 10c generated in the surface of the polycrystalline diamond bodies and the sintered diamond material was substantially circular around the point against which the diamond indenter was pressed.

TABLE 1

| | starting material | synthesis conditions | | composition (vol %) | | XRD | mean particle size of diamond particles (nm) | crack initiation load (N) |
| | | pressure (GPa) | temperature (° C.) | graphite | diamond | $I_{(220)}/I_{(111)}$ | | |
|---|---|---|---|---|---|---|---|---|
| Ex. 1 | fine graphite powder | 25 | 2300 | 0 | 100 | 0.13 | 38 | 15 |
| Ex. 2 | fine graphite powder | 25 | 1100 | 0 | 100 | 0.29 | 13 | 14 |
| Ex. 3 | fine graphite powder | 20 | 1900 | 0 | 100 | 0.22 | 29 | 18 |
| Ex. 4 | fine graphite powder | 20 | 1600 | 0 | 100 | 0.24 | 25 | 20 |
| Ex. 5 | fine graphite powder | 16 | 2100 | 0 | 100 | 0.19 | 30 | 16 |
| Ex. 6 | fine graphite powder | 15 | 2200 | 0 | 100 | 0.17 | 34 | 11 |
| Comp. Ex. 1 | fine graphite powder | 16 | 2600 | 0 | 100 | 0.07 | 250 | 6 |
| Comp. Ex. 2 | fine graphite powder | 15 | 1500 | 16 | 84 | 0.21 | 17 | 5 |
| Comp. Ex. 3 | fine graphite powder | 13 | 2000 | 14 | 86 | 0.17 | 22 | 5 |
| Comp. Ex. 4 | coarse graphite powder | 16 | 2300 | 0 | 100 | 0.20 | 60 | 7 |
| Comp. Ex. 5 | diamond powder/metal-based binder powder | 7 | 1800 | 0 | 100 (excluding binder) | — | 500 | 3 |

As shown in Table 1, the mean particle size of the diamond particles in each of Examples 1 to 6 was 13 to 38 nm. In this case, the crack initiation load in each of Examples 1 to 6 was 11 to 20 N.

In contrast, the mean particle size of the diamond particles in Comparative Example 1 was 250 nm which was larger than that of each of Examples 1 to 6. Moreover, the crack initiation load in Comparative Example 1 was 6 N which was smaller than the value of the crack initiation load in each of Examples 1 to 6, and apparently the strength was also smaller than that in each of Example 1 to 6.

In each of Comparative Examples 2 and 3, unconverted graphite was contained in the polycrystalline body. Moreover, the crack initiation load in each of Comparative Examples 2 and 3 was 5 N which was smaller than the value of the crack initiation load in each of Examples 1 to 6, and apparently the strength was also smaller than that in each of Example 1 to 6.

In Comparative Example 4, the mean particle size of the diamond particles was 60 nm which was larger than that in each of Examples 1 to 6. Moreover, the crack initiation load in Comparative Example 4 was 7 N which was smaller than the value of the crack initiation load in each of Examples 1 to 6, and apparently the strength was also smaller than that in each of Example 1 to 6.

In Comparative Example 5 in which the diamond powder and the binder powder were used as starting materials, the mean particle size was 500 nm which was larger than that in each of Examples 1 to 6. In this case, the crack initiation load was 3 N which was smaller than the value of the crack initiation load in each of Examples 1 to 6, and apparently the strength was also smaller than that in each of Example 1 to 6.

Further, each of the polycrystalline diamond bodies and the sintered diamond material according to the Examples and the Comparative Examples was attached to the tip of a ball end mill having a tip diameter of 0.5 mm, and the cutting performance was evaluated. Cemented carbide containing 12 mass % of cobalt (Co) was prepared as a workpiece, and cutting of 24 m was performed under the conditions of a rotation speed of 40000 rpm, a cutting speed of 120 mm/min, a cutting depth of 5 μm, and a feed rate of 5 μm. Table 2 shows amounts of wear of the tools after cutting was completed in terms of the relative ratio of the amount of wear in each of the Examples and the Comparative Examples with respect to the amount of wear in Example 1 (hereinafter, the relative ratio of tool wear).

TABLE 2

| | relative ratio of tool wear |
|---|---|
| Ex. 1 | 1 |
| Ex. 2 | 1.3 |
| Ex. 3 | 1.2 |
| Ex. 4 | 1.3 |
| Ex. 5 | 1.1 |
| Ex. 6 | 1.2 |
| Comp. Ex. 1 | Significant chipping occurred at the cutting edge, and machining was stopped. |
| Comp. Ex. 2 | Significant chipping occurred at the cutting edge, and machining was stopped. |
| Comp. Ex. 3 | Significant chipping occurred at the cutting edge, and machining was stopped. |
| Comp. Ex. 4 | 2.1 |
| Comp. Ex. 5 | 5.3 |

As shown in Table 2, the relative ratio of tool wear in the Examples was 1 to 1.3, with respect to Example 1 with the smallest amount of wear. In contrast, in each of Comparative Examples 1 to 3, significant chipping occurred at a cut length of 12 m, 13 m, and 15 m, respectively, where machining was stopped. The relative ratio of tool wear in each of Comparative Examples 4 and 5 was 2.1 and 5.3, respectively, which were significantly higher than that in each of Examples 1 to 6. It was thus confirmed that the polycrystalline diamond bodies in the Examples were tougher than the polycrystalline diamond bodies and the sintered diamond material in the Comparative Examples.

While the foregoing description of the embodiment and Examples of the present invention is given in the above manner, it is originally intended to appropriately combine or modify in various manners the features of the embodiment and Examples.

It should be construed that the embodiment and Examples disclosed herein are given by way of illustration in all respects, not by way of limitation. It is intended that the scope of the present invention is defined by claims, not by the embodiment and Examples described above, and encompasses all modifications and variations equivalent in meaning and scope to the claims.

REFERENCE SIGNS LIST 10 polycrystalline diamond body; 10c crack; 10s surface; D diamond indenter; Da tip angle; Dr tip radius; F load rate

The invention claimed is:

1. A polycrystalline diamond body comprising diamond particles,
   the diamond particles having a mean particle size of 50 nm or less,
   the diamond particles having a ratio of an X-ray diffraction intensity $I_{(220)}$ in a (220) plane with respect to an X-ray diffraction intensity $I_{(111)}$ in a (111) plane according to X-ray diffraction, expressed as a ratio $I_{(220)}/I_{(111)}$, of not less than 0.1 and not more than 0.3, and
   a crack initiation load being 10 N or more as measured in a fracture strength test by pressing a diamond indenter with a tip radius of 50 μm against a surface of the polycrystalline diamond body at a load rate of 100 N/min.

2. The polycrystalline diamond body according to claim 1, wherein
   the diamond particles have a mean particle size of 30 nm or less.

3. A cutting tool comprising the polycrystalline diamond body according to claim 1.

4. A wear-resistant tool comprising the polycrystalline diamond body according to claim 1.

5. A grinding tool comprising the polycrystalline diamond body according to claim 1.

* * * * *